United States Patent
Mahaffey

(10) Patent No.: US 12,532,992 B2
(45) Date of Patent: Jan. 27, 2026

(54) PRESSURIZED SOAP DISPENSER AND METHOD

(71) Applicant: Kimberly-Clark Worldwide, Inc., Neenah, WI (US)

(72) Inventor: Cleary E. Mahaffey, Townsend, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 216 days.

(21) Appl. No.: 18/259,599

(22) PCT Filed: Feb. 8, 2021

(86) PCT No.: PCT/US2021/017046
§ 371 (c)(1),
(2) Date: Jun. 28, 2023

(87) PCT Pub. No.: WO2022/169465
PCT Pub. Date: Aug. 11, 2022

(65) Prior Publication Data
US 2024/0065492 A1 Feb. 29, 2024

(51) Int. Cl.
*A47K 5/12* (2006.01)
(52) U.S. Cl.
CPC .......... *A47K 5/1209* (2013.01); *A47K 5/1217* (2013.01); *A47K 2005/1218* (2013.01)
(58) Field of Classification Search
CPC ................ A47K 5/1209; A47K 5/1217; A47K 2005/1218; A47K 5/14; B05B 9/0811;
(Continued)

(56) References Cited

U.S. PATENT DOCUMENTS 3,273,752 A * 9/1966 Horeczky ............ A47K 5/1217
250/210
8,292,128 B2 10/2012 Hagleitner
(Continued)

FOREIGN PATENT DOCUMENTS

CN 101592510 A 12/2009
CN 109247853 A 1/2019
(Continued)

OTHER PUBLICATIONS

Air Delights, GOJO Provon LTX-12 Foam Soap Dispensers, https://www.airdelights.com/Provon-LTX-12-dispenser-Gojo-Provon-LTX-12-Automatic-Dispenser.html, 2019, 3 pages.
(Continued)

*Primary Examiner* — Donnell A Long
(74) *Attorney, Agent, or Firm* — Dority & Manning, P.A.

(57) ABSTRACT

A dispenser for dispensing a metered dose of foam or liquid from a reservoir includes means for applying gas pressure either directly or indirectly to a liquid contained in the reservoir for dispensing a liquid or foam through a nozzle. Instead of using a direct pump, the dispenser uses gas pressure inside the dispenser that pushes the liquid out of the reservoir without coming into contact with the reservoir. The dispenser can include a battery operated gas pressure pump and a sensor that senses pressure within the dispenser. In one aspect, an actuator can open a valve for dispensing metered doses of a liquid or foam.

19 Claims, 4 Drawing Sheets

(58) Field of Classification Search
CPC ... B05B 9/0838; B05B 7/0018; B05B 12/008;
B05B 12/122; B05B 9/047; G05D
7/0635; B67D 1/0829; B67D 1/0831;
B67D 1/0832; Y10T 137/314
See application file for complete search history.

(56) References Cited

U.S. PATENT DOCUMENTS

| | | |
|---|---|---|
| 9,532,683 B2 | 1/2017 | Hagleitner |
| 9,980,615 B1 | 5/2018 | Maercovich |
| 10,010,224 B2 | 7/2018 | Pelfrey |
| 2003/0173376 A1* | 9/2003 | Bilskie ................ B67D 1/0406 222/129.1 |
| 2010/0270328 A1 | 10/2010 | Quinlan |
| 2019/0335958 A1 | 11/2019 | Proper et al. |

FOREIGN PATENT DOCUMENTS

| | | |
|---|---|---|
| JP | 6275554 B2 | 2/2018 |
| JP | 6359289 B2 | 7/2018 |
| JP | 2019017672 A | 2/2019 |

OTHER PUBLICATIONS

PCT Search Report Corresponding to Application No. PCT/US2021/017046 on Apr. 27, 2021.

\* cited by examiner

PRESSURIZED SOAP DISPENSER AND METHOD

RELATED APPLICATIONS

The present application is the national stage entry of International Patent Application No. PCT/US2021/017046 having a filing date of Feb. 8, 2021, which is incorporated herein in its entirety by reference thereto.

BACKGROUND

Various types of dispensers are known for dispensing liquid soap from a container as a metered dose of liquid or foam. These dispensers are typically used in public restroom facilities, hospitals and other healthcare facilities, food service establishments, and so forth. A number of the known dispensers utilize a housing that mounts onto a wall or other support surface, with the housing containing a replaceable liquid soap reservoir or container, such as a collapsible bag, bottle, or other type of disposable container. A pump mechanism is configured with the housing and mates with a dispensing neck of the soap container once the container has been properly seated in the housing. The pump mechanism is a permanent fixture of the housing and is not considered a disposable item.

Certain inherent drawbacks exist with dispensers that include a permanent pump mechanism. For example, because the pump mechanism is not replaceable, any malfunction of the pump renders the entire dispenser useless. The pump is susceptible to vandalism and abuse, particularly in public restroom facilities, and any malfunction that deprives users of use of the pump creates unsanitary conditions. Also, the pump mechanism must be designed for a countless number of operating cycles over the expected useful life of the dispenser, resulting in relatively expensive pump components.

Recently, dispensers have been introduced in the industry wherein the pump mechanism is a component of the disposable soap container. Economies of scale and improvements in pump components have made this type of dispenser a viable alternative. With this dispenser, the disposable liquid reservoir is filled with a liquid soap, and the pump mechanism (with dispensing nozzle) is subsequently attached to the reservoir, typically by screwing the pump mechanism onto a threaded neck component of the reservoir. The reservoir with attached pump mechanism may then be placed into a housing that is specifically designed to accommodate the unit, with the housing having an actuating member (i.e., a push panel or lever) that engages the pump mechanism.

Incorporating a soap pump into every refill cartridge for a soap dispenser, however, can add costs and inefficiencies. Consequently, a need exists for a soap dispenser that includes a pump for the soap that does not need to be replaced with each soap cartridge and can remain in operation for an extended period of time without becoming clogged or otherwise malfunctioning or degrading due to contact with the soap material.

SUMMARY

In general, the present disclosure is directed to a dispenser for liquids and foams, particularly a soap composition, that includes a pump mechanism that can be permanent with the dispenser. For instance, in one embodiment, the present disclosure is directed to a dispenser for soap that includes an air pressure pump that dispenses controlled amounts of soap using air pressure. In this manner, the pumping mechanism never comes into contact with the soap, thereby preventing degradation, corrosion and/or clogging.

For example, in one embodiment, the present disclosure is directed to a dispenser for dispensing a metered dose of foam or liquid from a reservoir. The dispenser optionally includes a housing defining an interior chamber for receiving a liquid reservoir, such as a replaceable liquid reservoir. A gas supplying device, which can be an air pump, is in fluid communication with the interior chamber or the replaceable liquid reservoir. The gas supplying device supplies a gas into the dispenser for placing a liquid contained in the replaceable liquid reservoir under pressure. The replaceable liquid reservoir is in fluid communication with a nozzle. A flow control device is located between the replaceable liquid reservoir and the nozzle for controlling flow of the liquid through the nozzle. In accordance with the present disclosure, the pressure applied to the liquid in the replaceable liquid reservoir by the gas supplying device permits metered doses of liquid or foam to be dispensed through the nozzle.

In one aspect, the dispenser further includes a pressure indicating device, such as a pressure sensor, that is in communication with a controller. The controller, which can comprise one or more microprocessors, is also in communication with the gas supplying device. Based on information received from the pressure indicating device, the controller can be configured to control gas being supplied from the gas supplying device for maintaining pressure within the interior chamber or within the replaceable liquid reservoir within preset limits.

The dispenser can also include an actuator that can be user activated so that the dispenser will dispense metered amounts of a liquid or foam. The actuator, for instance, can be a motion sensor, such as a hand sensor, or can be any suitable electronic device, such as a button, that is activated when pressed by a user. The actuator can be designed to control the flow control device, the gas supplying device, or both the flow control device and the gas supplying device for dispensing metered doses of liquid or foam through the nozzle.

In one embodiment, for instance, in order to dispense a dose of foam or liquid, the actuator, once actuated, causes the flow control device, which can be a valve, to open and permit flow through the nozzle for a defined period of time causing liquid or foam to exit through the nozzle due to the preset pressure exerted on the liquid in the replaceable liquid reservoir. After liquid or foam is dispensed through the nozzle, the controller can be configured to control the gas supplying device for supplying further amounts of a gas to the interior chamber or to the replaceable liquid reservoir for maintaining the liquid contained in the replaceable liquid reservoir under pressure within the preset limits. The above cycle can be repeated until all of the liquid in the replaceable liquid reservoir is depleted. Further, by maintaining the pressure within the preset limits, the amount of foam or liquid dispensed through the nozzle remains uniform.

In an alternative embodiment, the flow control device can be a pressure switch that is configured to permit flow through the nozzle once fluid pressure exerted on the flow control device is above a threshold pressure. In this embodiment, the actuator, once actuated, causes the gas supplying device to supply further amounts of a gas to the interior chamber or to the replaceable liquid reservoir for applying additional pressure to the liquid contained in the replaceable liquid reservoir causing fluid pressure to exceed the threshold pressure for a period of time thereby permitting a metered dose of liquid or foam to be dispensed through the nozzle.

As described above, the gas supplying device can be in fluid communication with the replaceable liquid reservoir or the interior chamber of the housing. When in fluid communication with the replaceable liquid reservoir, pressure is exerted directly on the liquid within the reservoir. The replaceable liquid reservoir can be configured to be pressurized or otherwise comprises a sealed container. A one-way valve can be positioned between the gas supplying device and the replaceable liquid reservoir which permits gas to flow into the replaceable liquid reservoir and prevents gas from flowing out of the replaceable liquid reservoir for maintaining pressure on the liquid. In one aspect, the replaceable liquid reservoir can include a top and a bottom. The dispenser can further comprise a liquid dispensing tube in communication with a nozzle. The liquid dispensing tube can include an open end positioned adjacent to the bottom of the replaceable liquid reservoir for dispensing controlled amounts of liquid from the replaceable liquid reservoir when pressure is applied by the gas supplying device.

Alternatively, the gas supplying device can be in fluid communication with the interior chamber of the housing. In this embodiment, the interior chamber is sealed and is capable of being pressurized. Pressurizing the interior chamber indirectly applies pressure to the liquid in the replaceable liquid reservoir. For example, the replaceable liquid reservoir can be made from a flexible container, such as a flexible polymer film. In this embodiment, the dispenser can include a one-way valve positioned between the gas supplying device and the interior chamber of the housing which permits gas to flow into the interior chamber of the housing and prevents gas from flowing out of the interior chamber of the housing in order to maintain pressure within the interior chamber within preset limits.

The dispenser can further include a power supply for providing power to the gas supplying device, the controller, an actuator, and any sensors contained within the dispenser. The power supply can comprise a battery.

In one aspect, the controller can also be configured to determine a liquid level within the replaceable liquid reservoir. In particular, the controller can monitor an amount of gas that is fed into the interior chamber or the replaceable liquid reservoir from the gas supplying device. By monitoring the amount of gas being fed into the dispenser, the controller can calculate liquid levels within the replaceable liquid reservoir. In fact, in one aspect, the dispenser can also be configured to do a "level check" by releasing a set amount of pressure from the replaceable liquid reservoir or from the interior chamber and then applying gas from the gas supplying device back into the replaceable liquid reservoir or the interior chamber. The amount of gas needed in order to arrive at a preset pressure level can then be used to calculate liquid levels within the replaceable liquid reservoir.

In one aspect, the preset limits of pressure applied to the liquid within the replaceable liquid reservoir can be based on one or more physical properties of the liquid contained in the reservoir. In fact, the controller can be configured to determine the preset limits based upon a property of the liquid such as viscosity. Alternatively, the replaceable liquid reservoir can include a machine readable code that is readable by the controller. The machine readable code can indicate to the controller the preset pressure limits based upon the physical properties of the liquid contained within the reservoir.

The present disclosure is also directed to a method for dispensing a liquid or foam from a dispenser. The method includes maintaining a liquid in a replaceable liquid reservoir under an amount of pressure within preset limits. The liquid is in fluid communication with a nozzle. A flow control device is positioned between the nozzle and the replaceable liquid reservoir. The method further includes the step of opening the flow control device for a period of time causing a metered dose of liquid or foam to be dispensed through the nozzle due to the preset pressure being applied to the liquid in the replaceable liquid reservoir. In one aspect, the method can further include the step of supplying additional gas pressure to the liquid in the replaceable liquid reservoir after metered doses of liquid or foam have been dispensed through the nozzle for maintaining the liquid in the replaceable liquid reservoir under pressure within the preset limits.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
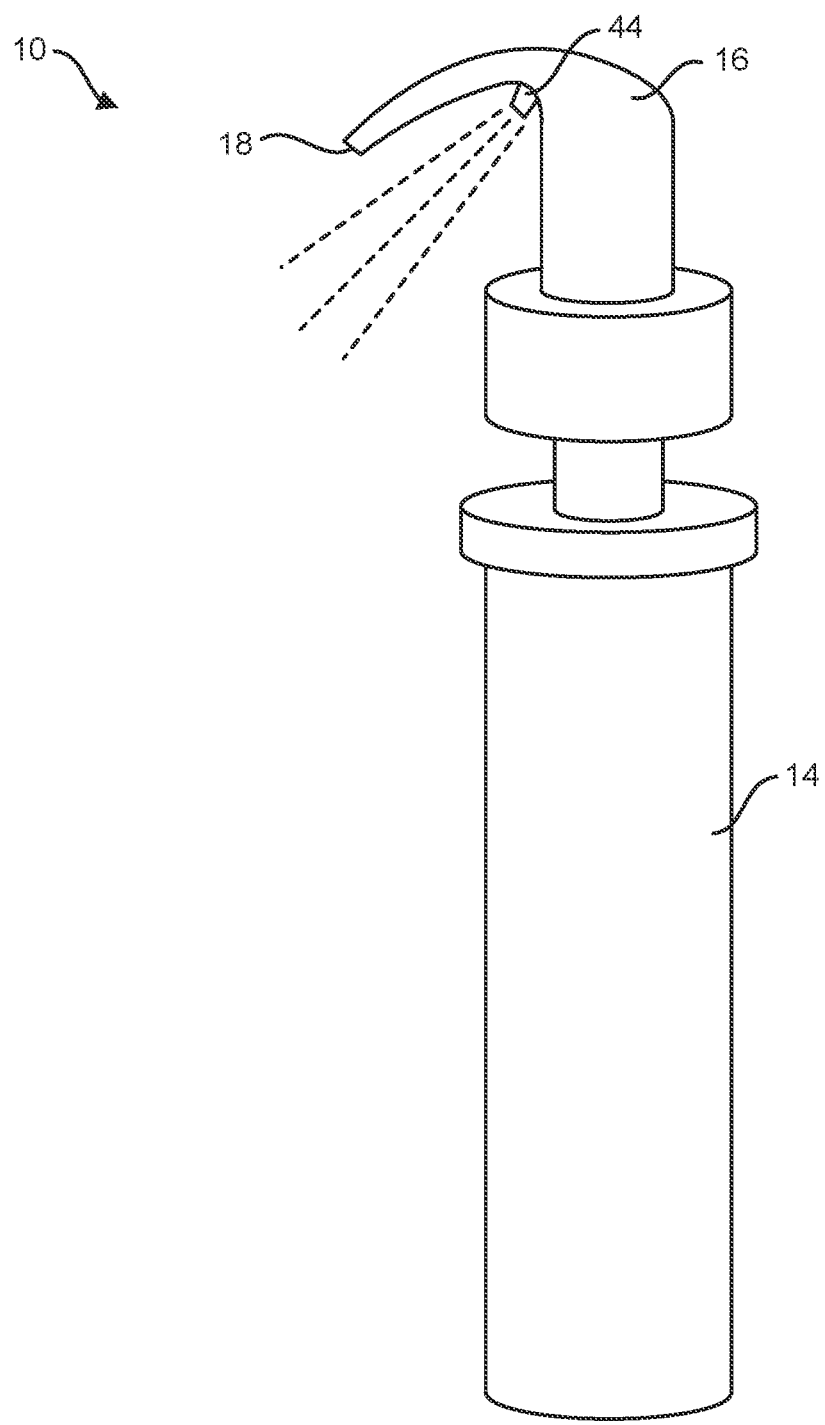
FIG. 1 is a side view of one embodiment of a dispenser made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a dispenser for containing a liquid and dispensing a liquid or foam. Although any viscous material can be dispensed from the dispenser, the dispenser is particularly well suited to dispensing a soap composition. The soap can be dispensed as a liquid or can be mixed with air and dispensed as a foam. In addition to soap, however, the dispenser can be used in numerous and diverse applications, such as for dispensing edible products such as condiments, industrial products such as oils, and personal care compositions such as lotions and creams.

In general, the dispenser of the present disclosure, instead of using a direct pump, uses gas pressure inside the dispenser in order to dispense liquids and foams. In this manner, the pump used to dispense the liquid does not come into contact with the liquid. In the past, for instance, many liquids such as soaps had a tendency to corrode and degrade the pump. Alternatively, the liquid such as soap had a tendency to cause clogging which required that the pump be removed and replaced frequently. The dispensing system of the present disclosure, however, is not only highly accurate but also prevents against the drawbacks and deficiencies of conventional soap dispensers.

Figure 2:
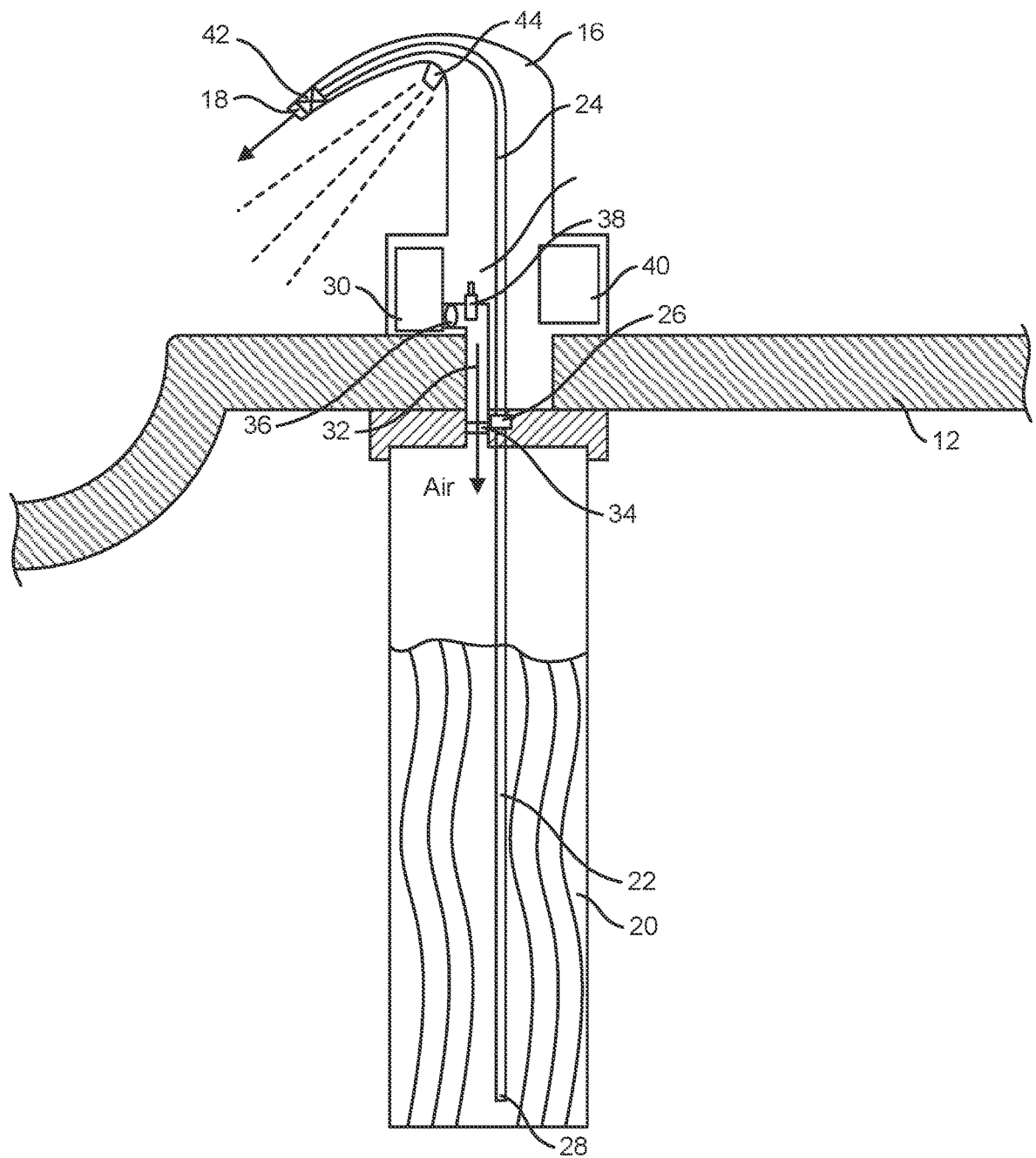
FIG. 2 is a cross-sectional view of the dispenser illustrated in FIG. 1.

Referring to FIGS. 1 and 2, one embodiment of a dispenser 10 made in accordance with the present disclosure is shown. In this embodiment, the dispenser 10 is intended to be mounted to a countertop 12 for dispensing a liquid or foam, such as a soap. As shown, a liquid reservoir 14 is mounted below the countertop 12 while a nozzle head 16 is mounted on top of the countertop 12. The nozzle head 16 defines a nozzle 18 through which a liquid or foam is dispensed.

Not shown, the liquid reservoir 14 may also be contained within a housing if desired. The liquid reservoir 14 is designed to be replaceable or refillable in order to maintain a continuous supply of liquid 20, such as a soap composition, within the dispenser 10.

As shown, a liquid dispensing tube 22 extends from a top of the liquid reservoir 14 and terminates adjacent to a bottom of the liquid reservoir 14. The liquid dispensing tube 22 defines an opening 28 for receiving and dispensing the liquid 20. The liquid dispensing tube 22 is connected to an outlet tube 24 by a first connecting device 26. The connecting device 26 is any suitable connecting device that is capable of connecting and disconnecting with the outlet tube 24 and/or the liquid dispensing tube 22. The outlet tube 24 is in fluid communication with the nozzle 18 for dispensing metered amounts of a liquid or foam.

The dispenser 10 shown in FIG. 2 further includes a gas supplying device 30 which can be an air pump. The gas supplying device 30 is in fluid communication with the liquid reservoir 14 via an air tube 32. In one aspect, the liquid reservoir 14 can include a second connection device 34 for releasably connecting to the air tube 32. In addition, a one-way valve 36 can be positioned between the gas supplying device 30 and the liquid reservoir 14 for permitting a gas, such as air, to flow into the liquid reservoir 14 and preventing a gas, such as air, from flowing into the gas supplying device 30.

The dispenser 10 can also include a controller in communication with the gas supplying device 30. The controller can be one or more microprocessors. In the embodiment illustrated in FIG. 2, the controller is incorporated into the gas supplying device 30. In alternative embodiments, however, the controller can be a separate component contained within the dispenser 10. The controller contained within the gas supplying device 30 is in communication with a pressure indicating device 38, such as a pressure sensor. The controller is configured to receive information from the pressure indicating device 38 for monitoring the pressure within the liquid reservoir 14.

The dispenser 10 further includes a flow control device 42 that controls flow of a liquid or foam through the nozzle 18. The dispenser 10 also includes an actuator 44. The actuator 44, for instance, can be user actuated for dispensing metered doses of liquid or foam through the nozzle 18. In the embodiment illustrated in FIG. 2, for instance, the actuator 44 comprises a hand sensor. The hand sensor, for instance, can be any suitable motion or object sensing device. In one aspect, for instance, the actuator 44 can be an IR sensor that senses the presence of a hand, which then causes the dispenser 10 to dispense metered amounts of a soap composition.

As shown in FIG. 2, the dispenser 10 includes a power supply 40. The power supply 40 can be contained within the dispenser or can be provided through connection with the electrical power supply of the room or building in which the dispenser is located. In the embodiment illustrated in FIG. 2, the power supply 40 is a battery. The battery 40 can be replaceable or can be rechargeable. The battery 40, for instance, can be recharged in any suitable manner.

During operation, the liquid reservoir 14 containing a liquid is connected to the nozzle 18 via the first connection device 26 and to the gas supplying device 30 through the second connection device 34. The gas supplying device is then activated supplying a gas, such as air, to the liquid reservoir 14. A controller associated with the gas supplying device 30 receives information from the pressure indicating device 38. The controller controls operation of the gas supplying device 30 until the liquid reservoir 14 is at a pressure within preset limits. For example, in one aspect, the pressure exerted on the liquid in the liquid reservoir 14 is sufficient to push the liquid from the liquid reservoir 14 out through the nozzle 18. In the embodiment illustrated in FIG. 2, the gas pressure that builds up within the liquid reservoir 14 acts directly on the liquid 20. Due to the pressure, the liquid 20 enters the opening 28 of the liquid dispensing tube 22. The flow control device 42 then controls flow of a liquid or foam through the nozzle 18. In this manner, metered doses of liquid or foam can be delivered to a user in a controlled manner. Of particular advantage, the gas supplying device 30 or pump never comes into contact with the liquid 20. Thus, the gas supplying device 30 is not subjected to any degradation or clogging that was experienced in past dispenser constructions.

The amount of pressure exerted on the liquid 20 can vary depending on various factors. In one aspect, the pressure can be adjusted depending on whether the dispenser is dispensing a liquid or foam. For example, in one aspect, the gas pressure causes gases to dissolve in the liquid. Upon release of pressure, the dissolved gas can form bubbles and produce a foam. When a foam is being dispensed, the nozzle 18 can include a porous membrane, such as a mesh, that facilitates formation of a foam.

The dispenser 10 can operate in various different ways in order to dispense controlled amounts of a liquid or foam. For example, in one embodiment, the actuator 44 is in communication with the flow control device 42 either directly or through use of the controller. Once the actuator 44 is actuated by a user, the flow control device 42, which is normally in a closed position that prevents flow, opens for a predetermined amount of time. Once the flow control device 42 is opened, a liquid or foam is dispensed through the nozzle 18 due to the pressure applied to the liquid 20 within the liquid reservoir 14. The amount of liquid or foam that is dispensed through the nozzle 18 can be controlled by controlling the amount of pressure applied to the liquid 20 in the liquid reservoir 14 and by controlling the amount of time that the flow control device 42 remains open. Controlling the pressure and the flow control device 42 allows for precise control over the volume of liquid or foam that is dispensed through the nozzle 18.

As liquid or foam is dispensed through the nozzle 18, the pressure within the liquid reservoir 14 will drop due to the removal of portions of the liquid 20. In accordance with the present disclosure, the pressure indicating device 38 can monitor the pressure within the liquid reservoir 14 and, once the pressure drops below a preset limit, can cause the controller to activate the gas supplying device 30. The gas supplying device 30 can then feed additional amounts of gas to the liquid reservoir 14 until the pressure is once again within preset limits. Once the set point pressure is reached within the liquid reservoir 14, the dispenser 10 remains in that state until the actuator 44 is actuated and further amounts of a liquid or foam are dispensed. In one aspect, the pressure within the liquid reservoir 14 is adjusted after each metered dose of liquid or foam is dispensed from the dispenser 10. In other aspects, however, multiple doses of liquid or foam can be dispensed from the dispenser before any pressure adjustments are needed within the liquid reservoir 14.

In an alternative embodiment, the flow control device 42 can be a pressure valve that only releases liquid through the nozzle 18 when fluid pressure is above a preset limit. In this embodiment, when the actuator 44 is activated, a controller causes the gas supplying device 30 to pump further amounts of gas into the liquid reservoir 14 for increasing pressure on the liquid 20. The pressure on the liquid 20 is increased until fluid pressure within the outlet tube 24 is above the pressure needed for the flow control device 42 to open and dispense metered doses of liquid or foam. In this embodiment, the amount of liquid or foam that is dispensed can depend upon how long the flow control device 42 remains open which can be set electronically or can be set based upon the amount of pressure that is applied to the liquid 20 in the liquid dispenser 14. In one aspect, the flow control device 42 closes as the pressure is reduced. In this embodiment, the gas supplying device can maintain pressure on the liquid 20 just below the dispensing pressure so that a liquid or foam can be dispensed quickly when actuated.

In still another embodiment, once the actuator 44 is actuated, the flow control device 42 and the gas supplying device 30 can be operated by a controller in tandem or in a synchronized manner in order to dispense metered amounts of a liquid or foam.

In one embodiment, the dispenser 10 can also include controls, software and/or hardware capable of monitoring liquid levels within the liquid reservoir 14. For example, in one embodiment, the controller associated with the gas supplying device 30 can monitor the amount of gas that is fed to the liquid reservoir 14. Based on the amount of gas fed to the liquid reservoir 14 and the associated preset pressure, the controller can then determine or calculate the volume of the liquid 20 contained in the liquid reservoir 14 for providing a level indicator. The level indicator can then be displayed graphically on the dispenser 10 and/or be sent to a central control station for monitoring liquid levels. In this manner, maintenance personnel can replace the liquid reservoir or refill the liquid reservoir 14 once liquid levels in the dispenser 10 reach a low set point. In this manner, liquid levels can be determined and monitored so that the dispenser 10 never achieves an empty state.

The dispenser 10 of the present disclosure can also be configured to conduct a "level check" procedure in order to check and determine the liquid level in the liquid reservoir 14. For example, pressure within the liquid reservoir can be released. In particular, all of the pressure can be released or just a portion of the pressure can be released. The controller can then supply gas to the liquid reservoir using the gas supplying device 30 until a set pressure is reached. By monitoring how much gas is introduced into the liquid reservoir, the controller can then determine or calculate the liquid level.

The amount of pressure exerted on the liquid 20 in the liquid reservoir 14 during operation of the dispenser 10 can vary depending upon many different factors, including the construction of the dispenser 10, the volume and size of the dispenser 10, and the physical properties of the liquid 20, including the viscosity. In one aspect, one or more physical properties of the liquid 20 can be inputted into the controller for determining the preset pressure amount. This can be done manually. Alternatively, the liquid reservoir 14 may include a machine readable code that can be read by the controller. The machine readable code can indicate to the controller the type of liquid contained in the liquid reservoir 14 for then setting the preset pressure amounts.

The operating pressure or pressure range of the dispenser can vary depending on many factors including the size and configuration of the dispenser, the type of composition being dispensed, whether the composition is dispensed as a liquid or foam, and the desired result. Without limitation, in one embodiment, the operating pressure of the dispenser 10 can be from about 3 psi to about 30 psi, including all increments of 1 psi therebetween.

Figure 3:
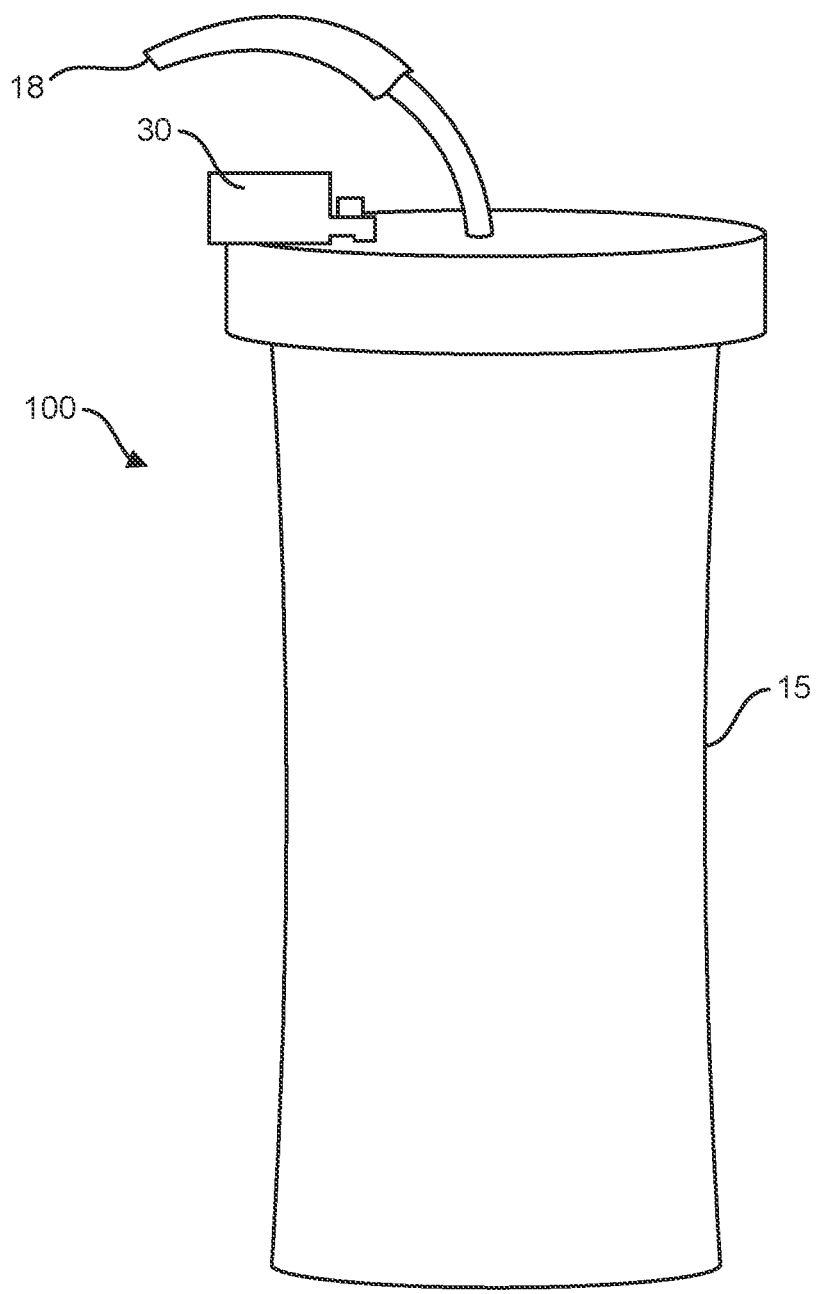
FIG. 3 is an alternative embodiment of a dispenser made in accordance with the present disclosure.
Figure 4:
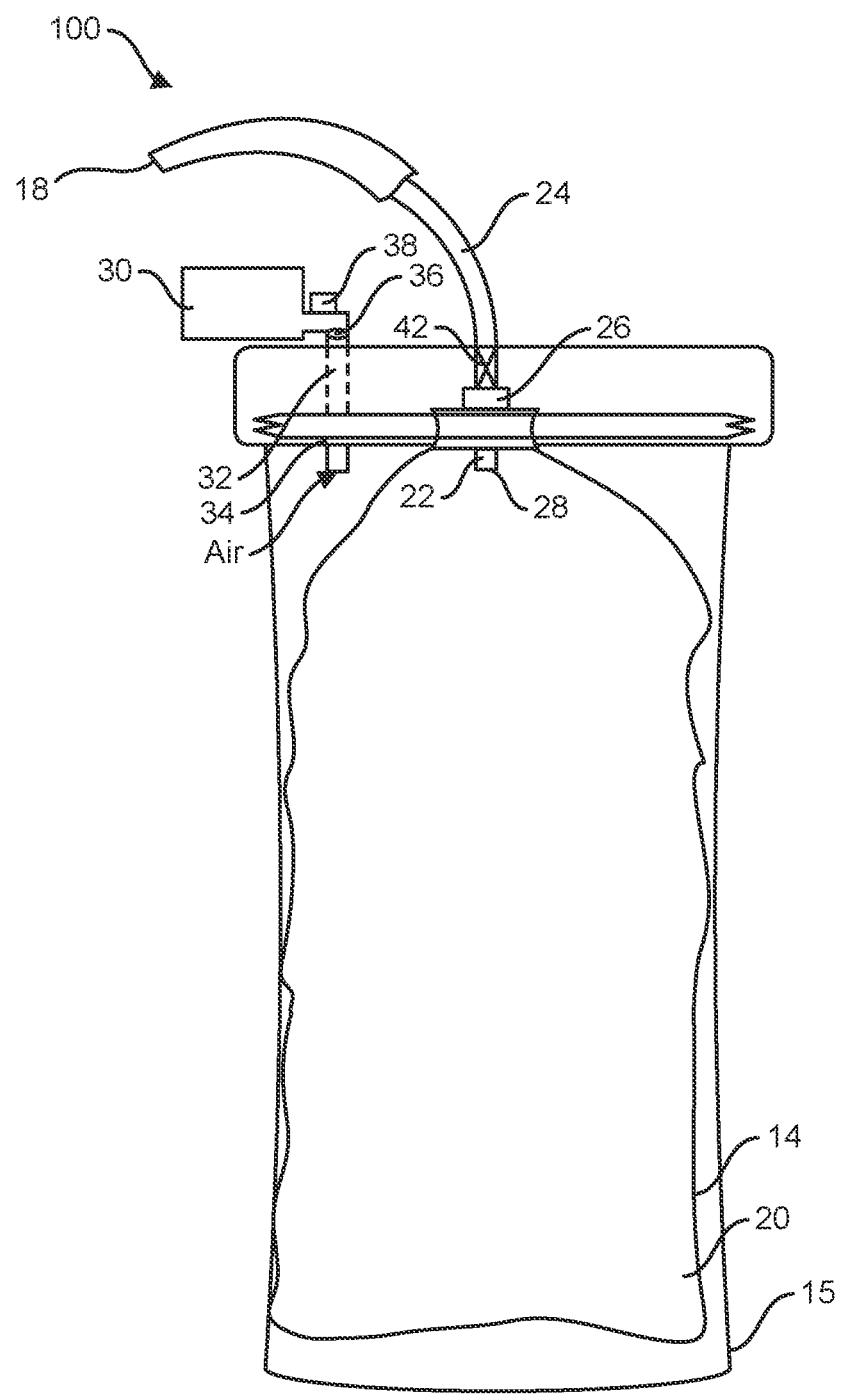
FIG. 4 is a cross-sectional view of the dispenser illustrated in FIG. 3.

Referring to FIGS. 3 and 4, another embodiment of a dispenser 100 made in accordance with the present disclosure is shown. Like reference numerals have been used to represent similar elements. As shown in FIG. 3 and particularly in FIG. 4, the dispenser 100 includes a liquid reservoir 14 containing a liquid 20. In this embodiment, the liquid reservoir 14 is contained within a housing 15. The reservoir 14 may be of any type of replaceable container or cartridge. In this embodiment, the liquid reservoir 14 is made from a flexible container. For instance, the liquid reservoir 14 can be a collapsible bag made from a flexible polymer material. The housing 15 defines an interior chamber having an appropriate size and configuration for secure receipt of the liquid reservoir 14.

The liquid reservoir 14 is in fluid communication with a nozzle 18 via a liquid dispensing tube 22 that is releasably attached to an outlet tube 24 using a first connection device 26. A flow control device 42, such as a valve, is positioned between the liquid dispensing tube 22 and the nozzle 18.

In accordance with the present disclosure, the dispenser 100 further includes a gas supplying device 30, such as an air pump, that is in fluid communication with the interior chamber of the housing 15 via an air tube 32. The dispenser 100 can further include a pressure indicating device 38, such as a pressure sensor, that is in communication with a controller, such as a microprocessor. The controller is also in communication with the gas supplying device 30 for controlling the amount of gas that is fed into the interior chamber of the housing 15. A one-way valve 36 is also located along the air tube 32 for only permitting gas to flow into the interior chamber of the housing 15 and preventing gas from leaving the chamber.

The dispenser 100 as shown in FIG. 4 can operate identical to the dispenser 10 as shown in FIG. 2. In the embodiment illustrated in FIG. 4, however, the gas pressure from the gas supplying device 30 is indirectly applied to the liquid 20. More particularly, the interior chamber of the housing 15 is pressurized which in turn exerts pressure on the walls of the liquid reservoir 14 for applying pressure to the liquid 20. Otherwise, the dispenser 100 as shown in FIG. 4 can have the same functionality as the dispenser illustrated in FIGS. 1 and 2.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A dispenser for dispensing a metered dose of foam or liquid from a reservoir comprising:

a liquid reservoir and optionally a housing defining an interior chamber for receiving the liquid reservoir;

a gas supplying device in fluid communication with the interior chamber or the liquid reservoir, the gas supplying device supplying a gas for placing a liquid contained in the liquid reservoir under pressure;

a nozzle in fluid communication with the liquid reservoir;

a flow control device located between the liquid reservoir and the nozzle for controlling flow of the liquid through the nozzle; and wherein pressure applied to the liquid in the liquid reservoir by the gas supplying device permits metered doses of liquid or foam to be dispensed through the nozzle;

the dispenser further comprising:

a pressure indicating device; and a controller in communication with the pressure indicating device and the gas supplying device, wherein, based on information received from the pressure indicating device, the controller controlling gas being supplied from the gas supplying device for maintaining pressure within the interior chamber or within the liquid reservoir within preset limits;

wherein the controller is further configured to determine a liquid level within the liquid reservoir from monitoring an amount of gas that is fed into the interior chamber or the liquid reservoir from the gas supplying device.

2. A dispenser as defined in claim 1, further comprising an actuator that controls the flow control device, the gas supplying device, or both of the flow control device and the gas supplying device for dispensing metered doses of liquid or foam through the nozzle.

3. A dispenser as defined in claim 2, wherein, in order to dispense a dose of liquid or foam, the actuator, once actuated, causes the flow control device to permit flow through the nozzle for a period of time causing liquid or foam to exit through the nozzle due to the preset pressure exerted on the liquid in the liquid reservoir.

4. A dispenser as defined in claim 3, wherein, after liquid or foam is dispensed through the nozzle, the controller controls the gas supplying device for supplying a gas to the interior chamber or the liquid reservoir for maintaining the liquid contained in the liquid reservoir under pressure within the preset limits.

5. A dispenser as defined in claim 2, wherein the flow control device comprises a pressure switch that is configured to permit flow through the nozzle once fluid pressure is above a threshold pressure, and wherein, in order to dispense a dose of liquid or foam, the actuator, once actuated, causes the gas supplying device to supply a gas to the interior chamber or to the liquid reservoir for applying additional pressure to the liquid contained in the liquid reservoir causing fluid pressure to exceed the threshold pressure for a period of time thereby permitting a metered dose of liquid or foam to be dispensed through the nozzle.

6. A dispenser as defined in claim 2, wherein the actuator comprises a hand sensor.

7. A dispenser as defined in claim 1, wherein the gas supplying device is in fluid communication with the liquid reservoir, the liquid reservoir being configured to be pressurized.

8. A dispenser as defined in claim 7, further comprising a one-way valve positioned between the gas supplying device and the liquid reservoir which permits gas to flow into the liquid reservoir and prevents gas from flowing out of the liquid reservoir.

9. A dispenser as defined in claim 7, wherein the liquid reservoir includes a top and a bottom and wherein the dispenser further comprises a liquid dispensing tube in communication with the nozzle, the liquid dispensing tube including an opening positioned adjacent to the bottom of the liquid reservoir for dispensing controlled amounts of liquid from the liquid reservoir when pressure is applied by the gas supplying device.

10. A dispenser as defined in claim 7, wherein the liquid reservoir includes a first connection device for releasably connecting to the gas supplying device and a second connection device for releasably connecting to an outlet tube leading to the nozzle.

11. A dispenser as defined in claim 1, wherein, the gas supplying device is in fluid communication with the interior chamber of the housing, the interior chamber of the housing been configured to be pressurized.

12. A dispenser as defined in claim 11, further comprising a one-way valve positioned between the gas supplying device and the interior chamber of the housing which permits gas to flow into the interior chamber of the housing and prevents gas from flowing out of the interior chamber of the housing.

13. A dispenser as defined in claim 11, wherein the liquid reservoir comprises a flexible container and wherein pressurizing the interior chamber of the housing exerts pressure on the liquid reservoir for dispensing controlled amounts of a liquid or foam through the nozzle.

14. A dispenser as defined in claim 13, wherein the liquid reservoir is formed from a flexible polymer film.

15. A dispenser as defined in claim 1, wherein the gas supplying device comprises an air pump.

16. A dispenser as defined in claim 1, further comprising a power supply for providing power to the gas supplying device.

17. A dispenser as defined in claim 1, wherein the controller is configured to determine the preset limits of the pressure based on one or more physical properties of the liquid contained in the liquid reservoir.

18. A dispenser as defined in claim 1, wherein the liquid reservoir includes a machine readable code that is readable by the controller for determining the preset levels of pressure within the interior chamber of the housing or the liquid reservoir.

19. A method for dispensing a liquid or foam from a dispenser and for determining a liquid level within a liquid reservoir comprising:

maintaining a liquid in the liquid reservoir under an amount of pressure within preset limits, the liquid being in communication with a nozzle, a flow control device being positioned between the nozzle and the liquid reservoir; and opening the flow control device for a period of time causing a metered dose of liquid or foam to be dispensed through the nozzle due to the preset pressure being applied to the liquid in the liquid reservoir, the method further comprising the step of supplying additional gas pressure to the liquid in the liquid reservoir after metered doses of liquid or foam have been dispensed through the nozzle for maintaining the liquid in the liquid reservoir under pressure within the preset limits, wherein the preset pressure is maintained by a pressure indicating device in communication with a controller controlling the gas being supplied from a gas supplying device, and wherein the controller is further configured to determine a liquid level within the liquid reservoir from monitoring an amount of gas that is fed into the interior chamber or the liquid reservoir from the gas supplying device.

* * * * *